Nov. 27, 1956  D. J. CHRISTENSON ET AL  2,772,030
FEEDING ROTORS FOR FERTILIZER DISTRIBUTORS
Filed June 30, 1955
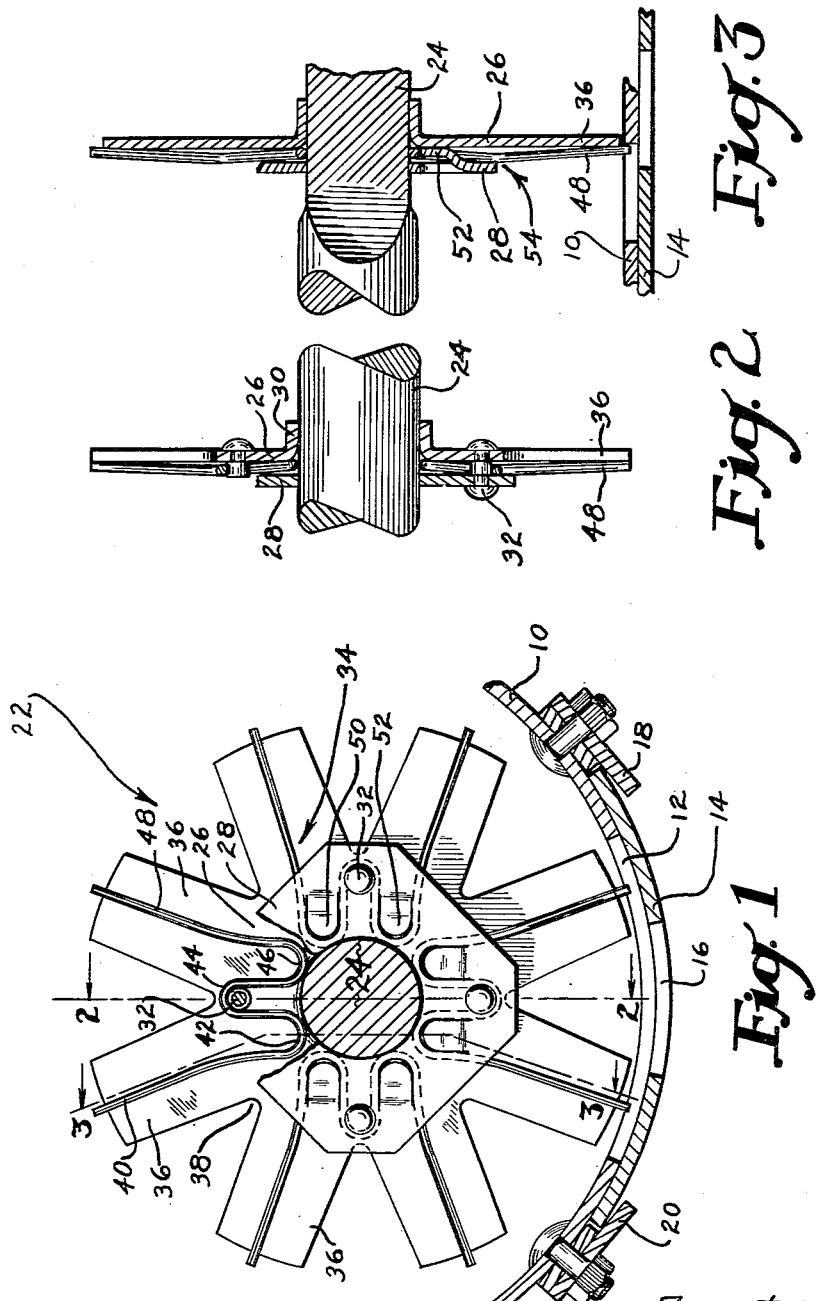
Inventors
DONALD J. CHRISTENSON
ARMAND A. SALERNO
By
Attorney United States Patent Office 2,772,030
Patented Nov. 27, 1956

2,772,030

FEEDING ROTORS FOR FERTILIZER DISTRIBUTORS

Donald J. Christenson, Kansasville, and Armand A. Salerno, Racine, Wis., assignors to J. I. Case Company, Racine, Wis., a corporation of Wisconsin Application June 30, 1955, Serial No. 519,092

5 Claims. (Cl. 222—242)

The present invention relates to improvements in feeding rotors for fertilizer distributors and an object of the invention is to generally improve the construction and operation of devices of this type.

Distributors for seeds, chemical fertilizers such as lime and other granular and often hygroscopic material, comprising elongated hoppers transported over the ground in a direction at right angles to their length have become quite popular, the hoppers having a series of adjustable feeding openings arranged along the bottom and a shaft within the hopper a short distance above the openings. The shaft has a series of rotors, one for each opening, which are driven by rotation of the shaft and which have portions passing into the openings a short distance to insure even feeding of the granular material, the shaft commonly serving as the axle for the wheels on which the device is supported and transported over the ground. Difficulty has been experienced in quantity production of these machines in locating the rotors accurately enough so that they will consistently reach into the openings and at the same time avoid inadvertently contacting the material of the hopper at the margins of the openings. If the latter occurs the openings are very soon damaged or enlarged and the accuracy of feeding is seriously impaired. Other types of rotors have been made wherein a series of flexible fingers made of spring wire are caused to enter the openings, the wires being easily deflected in case they encounter lumps in the fertilizer or if they inadvertently contact some part of the hopper.

Such rotors of course are relatively costly and further objects of the present invention are to improve upon the mounting of the wire fingers in a rotor of the latter type; to bias the fingers strongly toward their desired correct position; to provide a maximum possible amount of free length for distortion of the fingers without permanent bending; to securely anchor the fingers in place; and to devise expedients for so holding the fingers which will be as simple and inexpensive as possible. Further objects and advantages will become apparent from the following specification and accompanying drawings in which an illustrative embodiment is shown, but it is to be understood that the invention is not to be taken as limited to the particular construction disclosed as defined in the appended claims, which are to be interpreted as broadly as is consistent with the state of the art.

In the drawings Figure 1 is a cross section of a small portion of a fertilizer distributor showing one of the improved rotors with parts broken away, and in cooperation with one of the openings in the feed hopper;

Fig. 2 is a vertical section on the line 2—2 of Fig. 1; and

Fig. 3 is a section taken on the line 3—3 of Fig. 1.

Similar reference characters have been applied to the same parts throughout the drawings and specification.

Distributors of the type herein contemplated are well-known, a complete disclosure of a typical example being found in the patent to Juzwiak, No. 2,510,031, filed April 28, 1949, and patented June 6, 1950. This patent shows the general aspects of this type of spreader, the present invention of course dealing with a different type of rotor for discharging the material through the discharge openings.

As seen in Fig. 1, 10 represents the lower portion or bottom of the fertilizer hopper which is preferably arcuate in form and which provides an opening 12 for the discharge of material, a slide 14 having an opening 16 being maintained in place against the hopper bottom 10 by suitable means as strips 18 and 20, slide 14 being shiftable toward and from the observer in Fig. 1 so as to expose more or less of opening 16 to opening 12 all as well-known and fully disclosed in the foresaid patent. A rotor generally designated as 22 is mounted on a shaft 24 and comprises juxtaposed plates 26 and 28, in the present instance plate 26 having a hub portion 30 which fits and is welded or otherwise suitably fixed on shaft 24. Plate 28 is smaller than plate 26 and fastened thereto by shouldered rivets 32 which locate plate 28 spaced axially of shaft 24 a predetermined amount as apparent in Figs. 2 and 3 within which space are received spring wire units generally designated as 34. Plate 26 is preferably formed with a series of radially extending strips or arms 36 forming notches 38 therebetween, the arrangement being similar to the spokes of a wheel with the rim removed, strips 36 extending substantially beyond the margins of plate 28. For a symmetrical arrangement an even number of strips or spokes 36 is necessary and in the present instance eight are shown. Spring wire units 34 are double or bifurcated in aspect and each unit is associated with two of the strips 36.

Wire units 34 are preferably made of durable material such as hard steel or piano wire so as to be strong and at the same time yieldable in case of excessive loading from hardened fertilizer, encountering obstructions or the like, in such event the wires springing substantially out of the positions shown but returning immediately when the excessive stress is overcome or the obstruction is passed.

Wire units 34 in one position are similar to the capital letter W but with the usual sharp apexes rounded. Thus the W starts with a side finger 40 as seen in Fig. 1, which extends generally downward to a rounded apex 42, the wire continuing upward to a rounded apex 44, again downward to a rounded apex 46 and again upward in a side finger 48. As will be clear in Fig. 1 side finger 40 lies lengthwise of one of the strips 36, apex 44 encircles or passes on either side of one of the shouldered rivets 32 while side finger 48 lies along the next adjacent strip 36 circumferentially beyond the rivets 32. Side fingers 40 and 48 extend beyond the extremities of strips 36 and as seen at the lower part of Fig. 1 enter opening 12 so as to extend at least partially through the thickness of bottom portion 10. As will be apparent if there is any slight inaccuracy so that fingers 40 and 48 contact any part of bottom 10 they can readily spring out of the way and snap back into place after they have passed the contact point.

Rounded apexes 42 and 46 are located substantially in contact with the exterior of shaft 24 which serves to locate the innermost position of apexes 42 and 46, and locking plate 28, as best seen in Figs. 1 and 3, has tongue portions 50 and 52 cut therefrom and pressed into the clearance between plates 26 and 28, tongues 50 and 52 being of a shape to extend within apexes 42 and 46. Wire units 34 are therefore retained by tongues 50 and 52 astride rivets 32 within the space between plates 26 and 28. They are prevented from rocking about rivets 32 by contact with tongues 50 and 52 and with shaft 24, and the dimensions are so maintained in production that, while the wires are prevented from shifting out of position appreciably they are still free to spring throughout most of their length when one of the side fingers is displaced.

Such springing however is limited in one direction, namely axially of shaft 24 away from the observer in Fig. 1 by contact with strips 36. This is also apparent in Figs. 2 and 3 in which the wires are shown as lying against strips 36. In building the machine it is so planned that any critical dimensions will be determined in accordance with this position of the wires, springing away from strips 36 being relatively harmless. However for best operation it is desirable that wires 48 shall remain firmly in contact with strips 36. For this reason wire units 34 are bowed or arched as indicated at 54 so as to press firmly to the right against strips 36 and to the left against plate 28. The bending or bowing of the wires is substantially more than permitted by the clearance between plates 26 and 28 so that the wires are put in a prestressed condition when the parts are assembled. Owing to the highly elastic nature of the steel wire these W-shaped members will return to the position shown regardless of a surprising amount of distortion under adverse conditions, the wires returning to the original shape and position as soon as the distorting force is removed. For example if a stone or a lump of fertilizer lodges in openings 12 and 16 the wires will snap over it until it is either distinegrated or dislodged whereupon they will continue to work in the intended manner.

The new rotor is composed of only three different types of parts, exclusive of the rivets or fastening means, and therefore lends itself to economic high quality manufacture in quantity production.

The above being a complete disclosure of an illustrative embodiment of the invention, what is claimed as new and desired to be secured by Letters Patent of the United States is:

1. In a feeding rotor for a fertilizer distributor of the type including an elongated fertilizer hopper supported for movement over the ground transversely of the length of said hopper, a series of discharge openings in the bottom of the hopper and a rotating shaft adjacent the bottom of the hopper; a rotor on said shaft comprising a disk-like plate including an even number of substantially radially extending strips, uniformly circumferentially spaced about said shaft in a common plane substantially normal thereto and providing notches therebetween, a rivet extending through said plate adjacent the apex of alternate notches formed between said strips, a W-shaped finger member of spring wire having the outer fingers thereof extending along adjacent strips and the inner legs extending on opposite sides of one of said rivets, a locking plate overlying said spring wire member and secured in spaced relation to the first mentioned plate, axially of said shaft and a pair of tongues struck inwardly from said locking plate and engaging said wire member at the base of said side fingers whereby to prevent escape of said wire member from its position between said plates.

2. A feeding rotor for use in a fertilizer distributor of the type comprising a hopper providing a discharge opening in the bottom thereof, said rotor including a pair of plates mounted on a shaft for rotation therewith, said plates being spaced apart axially of said shaft, and a plurality of spring wire fingers disposed between the plates and having their ends extending beyond the margins thereof, said wire fingers having portions between said plates bowed to an extent sufficient to cause forcible contact of said wire with both plates, as a result of the resiliency of said spring wire fingers.

3. As an article of manufacture a wire finger unit for a distributor rotor for comminuted material comprising a member composed of a length of wire of suitable resilient character generally in the form of a letter W, including a side finger rounded at the bottom and continuing into a substantially vertical extending loop section, said loop section having a rounded top portion, and the wire continuing downwardly and being rounded at the bottom and extending again upwardly into another substantially vertically extending side finger.

4. In a feeding rotor for a fertilizer distributor of the type including an elongated fertilizer hopper supported for movement over the ground transversely of the length of said hopper, a series of discharge openings in the bottom of the hopper and a rotating shaft adjacent the bottom of the hopper; a rotor on said shaft comprising a disk-like plate including a number of substantially radially extending strips, circumferentially spaced about said shaft in a common plane substantially normal thereto and providing notches therebetween, a finger member of spring wire extending along each strip and having the outer extremity thereof projecting beyond the margin of said strip, a locking plate overlying said spring wire member and secured in predetermined spaced relation to the first mentioned plate, axially of said shaft, said wire having the portion between said plates bowed to an extent sufficient to cause forcible contact of said wire with both plates and oriented to press against the margin of the adjacent strip, and said rotor being located in relation to said opening so that said wire enters the opening adjacent the side thereof toward which said wire is forced, whereby any disortion of said wire will be in a direction away from the margin of said opening and any deflection toward said margin will be prevented by said strip.

5. In a feeding rotor for a fertilizer distributor of the type including an elongated fertilizer hopper supported for movement over the ground transversely of the length of said hopper, a series of discharge openings in the bottom of the hopper and a rotating shaft adjacent the bottom of the hopper; a rotor on said shaft comprising a disk-like plate including a number of substantially radially extending strips, circumferentially spaced about said shaft in a common plane substantially normal thereto and providing notches therebetween, a finger member of spring wire extending along each of said strips, a locking plate overlying said spring wire members and secured in spaced relation to the first mentioned plate, axially of said shaft, and said wire fingers having portions between said plates bowed to an extent sufficient to cause forcible contact of said wire with both plates and oriented to press against the outer margins of said strips.

No references cited.